United States Patent [19]

Link

[11] Patent Number: 5,077,191

[45] Date of Patent: Dec. 31, 1991

[54] PHOTOGRAPHIC SENSITIZING DYES

[75] Inventor: Steven G. Link, Rochester, N.Y.

[73] Assignee: Eastman Kodak Company, Rochester, N.Y.

[21] Appl. No.: 456,425

[22] Filed: Dec. 26, 1989

[51] Int. Cl.$^5$ .............................................. C03C 1/22
[52] U.S. Cl. ..................................... 430/592; 430/591
[58] Field of Search ...................... 430/591, 592, 577

[56] References Cited

U.S. PATENT DOCUMENTS

| | | | |
|---|---|---|---|
| T. 888,016 | 12/1970 | Kalenda | 96/126 |
| 2,177,402 | 10/1939 | Brooker | 260/240 |
| 2,548,571 | 4/1951 | VanLare et al. | 260/240.4 |
| 2,656,352 | 10/1953 | Knott et al. | 430/578 |
| 3,364,026 | 1/1968 | Rees | 96/64 |
| 3,627,534 | 12/1971 | Shiba et al. | 96/135 |
| 3,630,749 | 12/1971 | Webster | 430/592 |
| 3,743,638 | 7/1973 | Webster et al. | 260/240.4 |

*Primary Examiner*—Charles L. Bowers, Jr.
*Assistant Examiner*—Janet C. Baxter
*Attorney, Agent, or Firm*—Andrew J. Anderson

[57] ABSTRACT

Dyes are described having the formula:

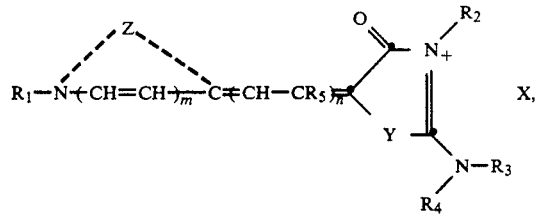

$n$ is 0, 1, or 2, $m$ is 0 or 1, $R_1$ and $R_2$ are each independently substituted or unsubstituted alkyl or aryl, $R_3$ and $R_4$ are each independently substituted or unsubstituted alkyl or aryl, or together with the nitrogen to which they are attached, form a substituted or unsubstituted heterocyclic ring, $R_5$ is H, lower alkyl, or substituted or unsubstituted or aryl when $n$ is 1, and H when $n$ is 2, Z represents the atoms necessary to complete a substituted or unsubstituted 5- or 6-membered heterocyclic ring, Y represents S or N-$R_6$ wherein $R_6$ is substituted or unsubstituted alkyl or aryl, and X is a counterion as needed to balance the charge of the molecule.

the dyes are useful as sensitizing dyes for photographic materials.

8 Claims, No Drawings

PHOTOGRAPHIC SENSITIZING DYES

FIELD OF THE INVENTION

This invention relates to photography, and specifically to sensitizing dyes for photographic materials.

BACKGROUND OF THE INVENTION

Silver halide photography usually involves the exposure of silver halide with light in order to form a latent image that is developed during photographic processing to form a visible image. Silver halide is intrinsically sensitive only to light in the blue region of the spectrum. Thus, when silver halide is to be exposed to other wavelengths of radiation, such as green or red light in a multicolor element or infrared radiation in an infrared-sensitive element, or when it is desired to augment the intrinsic sensitivity to blue light, a spectral sensitizing dye is required. Sensitizing dyes are chromophoric compounds (usually cyanine dye or merocyanine compounds) that are adsorbed to the silver halide. They absorb light or radiation of a particular wavelength and transfer the energy to the silver halide to form the latent image, thus spectrally sensitizing the silver halide.

Merocyanines are well-known as spectral sensitizing dyes. For example, U.S. Pat. No. 2,177,402 describes merocyanines having a thiazolone nucleus. Some of these dyes can be represented by the formula:

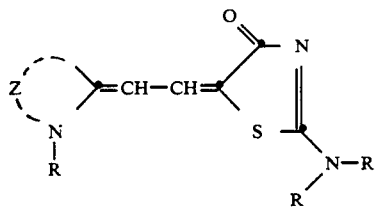

where R is alkyl or aryl and Z is a heterocycle.

U.S. Defensive Publication T888,016 describes merocyanine sensitizing dyes, some of which can be represented by the formula:

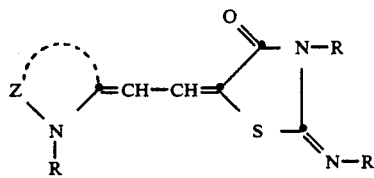

where R is alkyl or aryl and Z is a heterocycle.

Many spectral sensitizing dyes, however, suffer from a number of problems. Many dyes cause undesirable post-processing stain in photographic elements. Other dyes, such as the above-described dyes of U.S. Pat. No. 2,177,402 and U.S. T888,016, may be limited in the level of sensitivity (i.e., photographic speed) imparted to silver halide emulsions.

It is thus an object of the present invention to provide a merocyanine spectral sensitizing dye that provides high sensitivity to silver halide emulsions without causing objectionable post-processing stain.

SUMMARY OF THE INVENTION

According to the present invention, there is provided a spectral sensitizing dye for silver halide having the formula:

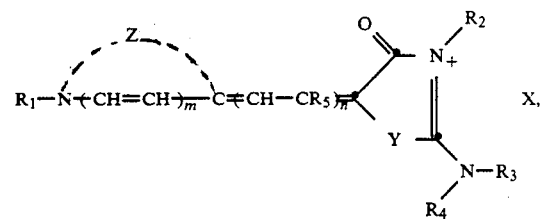

wherein
n is 0, 1, or 2,
m is 0 or 1,
$R_1$ and $R_2$ are each independently substituted or unsubstituted alkyl or aryl,
$R_3$ and $R_4$ are each independently substituted or unsubstituted alkyl or aryl, or together with the nitrogen to which they are attached, form a substituted or unsubstituted heterocyclic ring,
$R_5$ is H, lower alkyl, or substituted or unsubstituted aryl when n is 1, and H when n is 2,
Z represents the atoms necessary to complete a substituted or unsubstituted 5- or 6-membered heterocyclic ring,
Y represents S or N—$R_6$ wherein $R_6$ is substituted or unsubstituted alkyl or aryl, and
X is a counterion as needed to balance the charge of the molecule.

The dyes of formula (I) effectively sensitize silver halide emulsions useful in photographic materials. The dyes impart high sensitivity to the silver halide without undesirable levels of post-processing stain. Also, when n=1, many of the dyes are useful in sensitizing silver halide to blue light (such as from a xenon lamp or an argon laser) with little sensitivity beyond 570 nm so as to allow handling under safelights.

DESCRIPTION OF THE PREFERRED EMBODIMENTS

According to formula (I), Z represents the atoms necessary to complete a substituted or unsubstituted 5- or 6-membered heterocyclic nucleus. These include a substituted or unsubstituted: thiazole nucleus, oxazole nucleus, selenazole nucleus, quinoline nucleus, tellurazole nucleus, pyridine nucleus, thiazoline nucleus, indoline nucleus, oxadiazole nucleus, thiadiazole nucleus, or imidazole nucleus. This nucleus may be substituted with known substituents, such as halogen (e.g., chloro, fluoro, bromo), alkoxy (e.g., methoxy, ethoxy), substituted or unsubstituted alkyl (e.g., methyl, trifluromethyl), substituted or unsubstituted aryl, substituted or unsubstituted aralkyl, sulfonate, and others known in the art. Especially preferred are dyes where Z completes a substituted or unsubstituted benzoxazole, benzothiazole, thiazole, or thiazoline nucleus.

Examples of useful nuclei for Z include: a thiazole nucleus, e.g., thiazole, 4-methylthiazole, 4-phenylthizole, 5-methylthiazole, 5-phenylthiazole, 4,5-dimethyl-thiazole, 4,5-diphenylthiazole, 4-(2-thienyl)thiazole, benzothiazole, 4-chlorobenzothiazole, 5-chlorobenzothiazole, 6-chlorobenzothiazole, 7-chlorobenzothiazole, 4-methyl-benzothiazole, 5-methylbenzothiazole, 6- methylbenzothiazole, 5-bromobenzothiazole, 6-bromobenzothiazole, 5-phenylbenzothiazole, 6-phenylbenzothiazole, 4-methoxybenzothiazole, 5-methoxybenzothiazole, 6-methoxybenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, naphtho[2,1−d]thiazole, naphtho[1,2−d]thiazole, 5-methoxynaphtho[2,3−d]thiazole, 5-ethoxynapho[2,3−d]thiazole, 8-methoxynaphtho[2,3−d]thiazole, 7-methoxy-naphtho[2,3−d]thiazole, 4'-methoxythianaphtheno-7',6'-4,5-thiazole, etc.; an oxazole nucleus, e.g., 4-methyloxazole, 5-methyloxazole, 4-phenyloxazole, 4,5-diphenyloxazole, 4-ethyloxazole, 4,5-dimethyloxazole, 5-phenyloxazole, benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole 5-ethoxybenzoxazole, 5-chlorobenzoxazole, 6-methoxybenzoxazole, 5-hydroxybenzoxazole, 6-hydroxybenzoxazole, naphtho[2,1−d]oxazole, naphtho[1,2−d]oxazole, etc.; a selenazole nucleus, e.g., 4-methylselenazole, 4-phenylselenazole, benzoselenazole, 5-chlorobenzoselenazole, 5-methoxybenzoselenazole, 5-hydroxybenzoselenazole, tetrahydrobenzoselenazole, naphtho[2,1−d]selenazole, naphtho[1,2−d]selenazole, etc.; a pyridine nucleus, e.g., 2-pyridine, 5-methyl-2-pyridine, 4-pyridine, 3-methyl-4-pyridine, etc.; a quinoline nucleus, e.g., 2-quinoline, 3-methyl-2-quinoline, 5-ethyl-2-quinoline, 6-chloro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 7-methyl-4-quinoline, 8-chloro-4-quinoline, etc.; a tellurazole nucleus, e.g., benzotellurazole, naphtho[1,2−d]tellurazole, 5,6-dimethoxytellurazole, 5-methoxytellurazole, 5-methyltellurazole; a thiazoline nucleus, e.g., thiazoline, 4-methylthiazoline, etc; a benzimidazole nucleus, e.g., benzimidazole, 5-trifluoromethylbenzimidazole, 5,6-dichlorobenzimidazole; an indoline nucleus, 3,3-dimethylindoline, 3,3-diethylindoline, 3,3,5-trimethylindoline; or a diazole nucleus, e.g., 5-phenyl-1,3,4-oxadiazole, 5-methyl-1,3,4-thiadiazole.

$R_1$, $R_2$, $R_3$, $R_4$, and $R_6$ may be substituted or unsubstituted aryl (preferably of 6 to 15 carbon atoms), or more preferably, substituted or unsubstituted alkyl (preferably of from 1 to 6 carbon atoms). Examples of aryl include phenyl, tolyl, p-chlorophenyl, and p-methoxyphenyl. Examples of alkyl include methyl, ethyl, propyl, isopropyl, butyl, hexyl, cyclohexyl, decyl, dodecyl, etc., and substituted alkyl groups (preferably a substituted lower alkyl containing from 1 to 6 carbon atoms), such as a hydroxyalkyl group, e.g., 2-hydroxyethyl, 4-hydroxybutyl, etc., an alkoxyalkyl group, e.g., 2-methoxyethyl, 4-butoxybutyl, etc., a carboxyalkyl group, e.g., 2-carboxyethyl, 4-carboxybutyl, etc.; a sulfoalkyl group, e.g., 2-sulfoethyl, 4-sulfobutyl, etc., a sulfatoalkyl group, e.g., 2-sulfatoethyl, 4-sulfatobutyl, etc., an acyloxyalkyl group, e.g., 2-acetoxyethyl, 3-acetoxypropyl, 4-butyryloxybutyl, etc., an alkoxycarbonylalkyl group, e.g., 2-methoxycarbonylethyl, 4-ethoxycarbonylbutyl, etc., or an aralkyl group, e.g., benzyl, phenethyl, etc., or, any aryl group, e.g., phenyl, tolyl, naphthyl, methoxyphenyl, chlorophenyl, etc. Alkyl and aryl groups may be substituted by one or more of the substituents exemplified above. In one embodiment of the invention, at least one of $R_1$ and $R_2$ is substituted with an acid or acid salt substituent. In a further embodiment, $R_1$ is alkyl substituted with an acid or acid salt substituent.

$R_3$ and $R_4$ may also, together with the nitrogen atom to which they are attached, form a substituted or unsubstituted heterocyclic ring. Examples of such rings include piperidine, pyrrolidine, morpholine, 3-pyrroline, and the like.

$R_5$ is H, lower alkyl, or substituted or unsubstituted aryl when n is 1, and H when n is 2. When n is 0, $R_5$ is not present in the molecule. Lower alkyl groups for $R_5$ should be unsubstituted and are preferably from 1 to 6 carbon atoms (e.g., methyl, ethyl, n-butyl). Substituted or unsubstituted aryl groups are as described above for $R_1$, $R_2$, $R_3$, $R_4$, and $R_6$.

X represents a counterion as necessary to balance the charge of the dye molecule. Counterions may be ionically complexed to the molecule or they may be part of the dye molecule itself to form an intramolecular salt. The presence of such intramolecular counterions affects the form X takes, or whether it is present. For example, when the dye molecule is substituted with at least two anionic substituents (e.g., sulfo), then X will be a cation. Similarly, if the dye molecule is substituted with only one anionic substituent, the counterion X is not present, and when the dye molecule is substituted with no anionic substituents, X is an anion. Such counterions are well-known in the art. Useful anionic counterions include chloride, bromide, iodide, p-toluene sulfonate, methane sulfonate, methyl sulfate, ethyl sulfate, perchlorate, and the like. Useful cationic counterions include sodium, potassium, triethylammonium, and the like.

In formula (I), n can represent 0, 1, or 2. In one preferred embodiment, the dye of formula (I) is used in an element that is to be exposed to blue light sources (e.g., an argon ion laser or a xenon lamp) and handling under a yellow safelight). In such an embodiment, n is preferably 1 and Z preferably represents a substituted or unsubstituted: oxazole or thiazoline nucleus.

Examples of dyes according to formula (I) include the following:

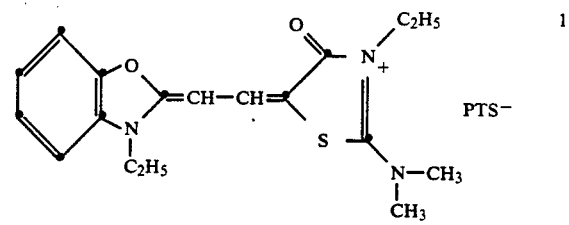

(PTS⁻ =p-toluene sulfonate⁻)

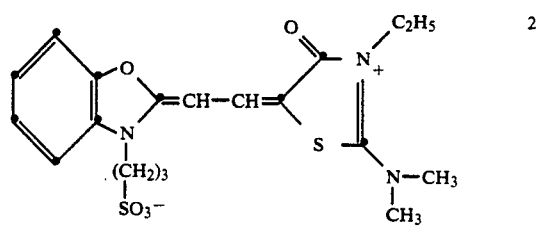

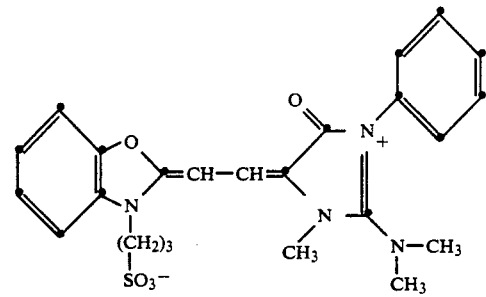
3
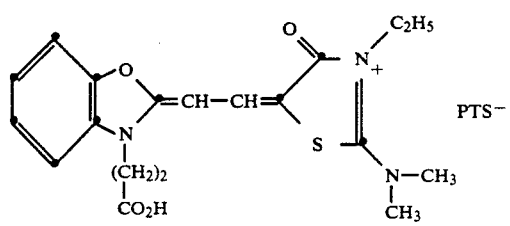
4
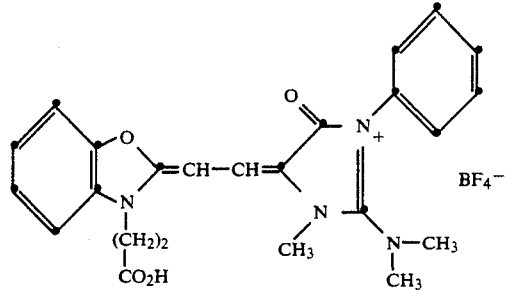
5
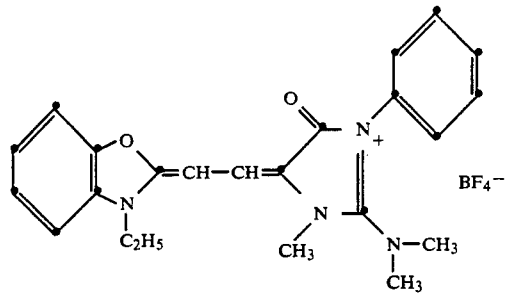
6
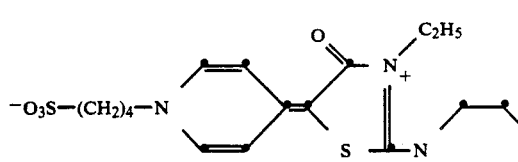
7
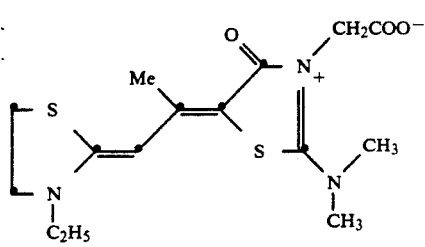
8
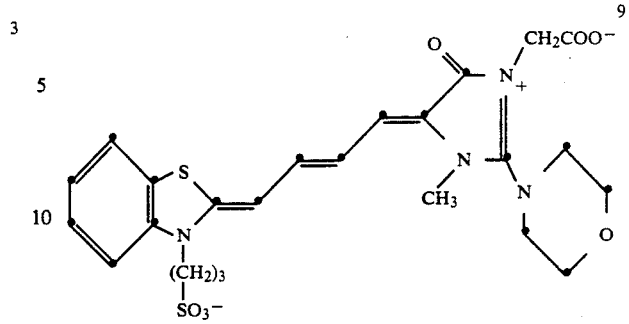
9
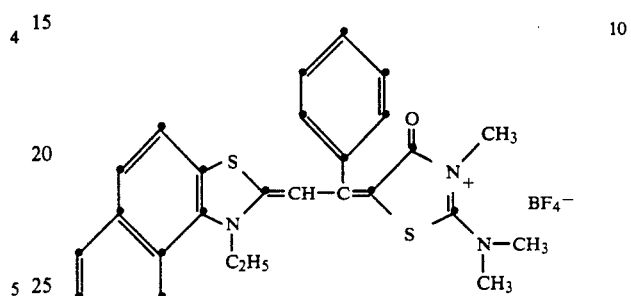
10
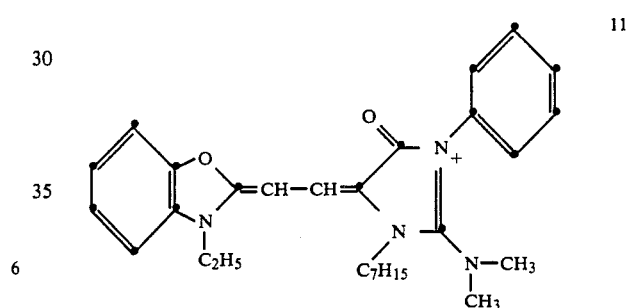
11
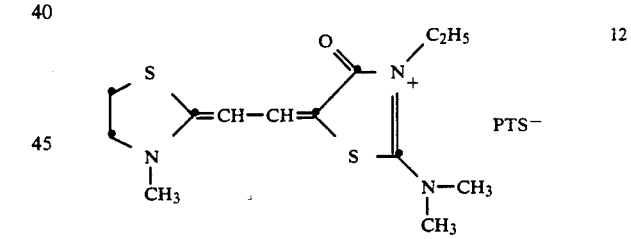
12
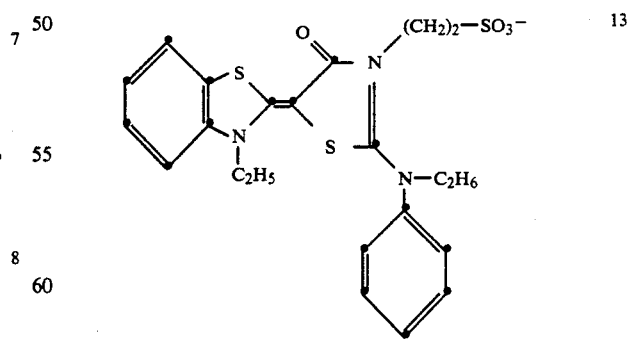
13
The dyes according to formula (I) may be synthesized by reacting known merocyanine dyes having a rhodanine or thiohydantoin nucleus first with an alkylating agent and then with a secondary amine. The merocyanine starting materials can be synthesized by techniques known in the art, such as described in Hamer, *Cyanine Dyes and Related Compounds*, 1964.

The dyes of formulas (I) are used to sensitize photographic silver halide emulsions. These silver halide emulsions can contain grains of any of the known silver halides, such as silver bromide, silver chloride, silver bromoiodide, and the like, or mixtures thereof, as described in *Research Disclosure*, Item 17643, December, 1978 [hereinafter referred to as *Research Disclosure I*], Section I. The silver halide grains may be of any known type, such as spherical, cubic, or tabular grains, as described in *Research Disclosure I*, Section I or *Research Disclosure*, Item 22534, January, 1983.

The silver halide emulsions generally include a hydrophilic vehicle for coating the emulsion as a layer of a photographic element. Useful vehicles include both naturally-occurring substances such as proteins, protein derivatives, cellulose derivatives (e.g., cellulose esters), gelatin (e.g., alkali-treated gelatin such as cattle bone or hide gelatin, or acid-treated gelatin such as pigskin gelatin), gelatin derivatives (e.g., acetylated gelatin, phthalated gelatin, and the like), and others described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I*. The vehicle can be present in the emulsion in any amount known to be useful in photographic emulsions.

The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof, as illustrated in *Research Disclosure*, June, 1975, item 13452 and U.S. Pat. No. 3,772,031.

Other addenda include brighteners, antifoggants, stabilizers, filter dyes, light absorbing or reflecting pigments, vehicle hardeners such as gelatin hardeners, coating aids, dye-forming couplers, and development modifiers such as developement inhibitor releasing couplers, timed development inhibitor releasing couplers, and bleach accelerators. These addenda and methods of their inclusion in emulsion and other photographic layers are well-known in the art and are disclosed in *Research Disclosure I* and the references cited therein.

The emulsion layer containing silver halide sensitized with the dye of the invention can be coated simultaneously or sequentially with other emulsion layers, subbing layers, filter dye layers, or interlayers or overcoat layers, all of which may contain various addenda known to be included in photographic elements. These include antifoggants, oxidized developer scavengers, DIR couplers, antistatic agents, optical brighteners, light-absorbing or light-scattering pigments, and the like.

The layers of the photographic element can be coated onto a support using techniques well-known in the art. These techniques include immersion or dip coating, roller coating, reverse roll coating, air knife coating, doctor blade coating, stretch-flow coating, and curtain coating, to name a few. The coated layers of the element may be chill-set or dried, or both. Drying may be accelerated by known techniques such as conduction, convection, radiation heating, or a combination thereof.

The photographic element of the invention can be black and white or color. Color dye-forming couplers and the various addenda associated therewith are well-known in the art and are described, for example, in *Research Disclosure I*, Section VII, and the references cited therein.

The element of the invention can be processed after exposure by any of the known processing methods and chemicals, as described in Research Disclosure I.

The invention is further described in the following examples.

EXAMPLE 1

Synthesis of Dye 1

3.32 g of a compound having the formula:

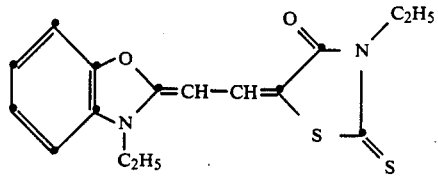

was combined with 6.2 ml methyl p-toluene sulfonate with stirring at 100° C. for 3 hours. After 1 hour, the mixture became semi-solid and would not stir. The mixture was cooled, acetone was added to liquify, and the mixture was poured into 75 ml acetone. This mixture was stirred for 10 minutes, and then refrigerated. The solids were collected and washed with acetone and recrystallized. The resulting compound had the formula:

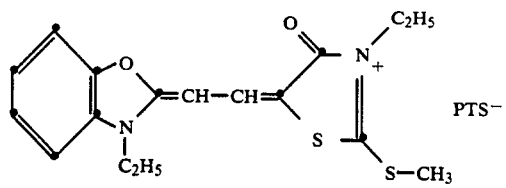

($PTS^- = $p-toluene sulfonate$^-$)

1.04 g of this compound was dissolved in 50 ml $CH_2Cl_2$ with stirring, and then chilled. Excess dimethylamine (~1 ml) was added, and the mixture was stirred at room temperature for 30 minutes. The mixture was then evaporated to dryness. A small amount of acetone was added to dissolve the remaining material, after which solids began to precipitate. The mixture was refrigerated, and the solids were collected and recrystallized from acetonitrile to yield 0.06 g of dye 1. $\lambda$-max (methanol)=469 nm, $\epsilon$-max=$9.08 \times 10^4$.

EXAMPLE 2

Synthesis of Dye 12

2.86 g of a compound having the formula:

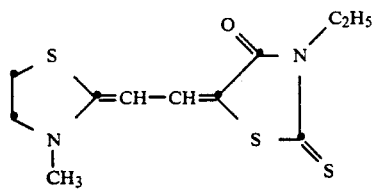

was combined with 6.2 ml methyl p-toluene sulfonate with stirring at 120° C. for 1 hour. The mixture was cooled, acetone was added to liquify, and the solids were collected by filtration, and dried. The resulting compound had the formula:

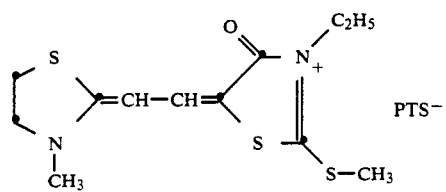

1.42 g of this compound was dissolved in 50 ml $CH_2Cl_2$ with stirring, and then chilled. Excess dimethylamine (~1-1.5 ml) was added, and the mixture was stirred at room temperature for 30 minutes. The mixture was then evaporated to dryness. A small amount of isopropyl alcohol was added to dissolve the remaining material. The mixture was refrigerated, and the solids were collected to yield 0.18 g of dye 12. λ-max (methanol)=455 nm, ε-max=$6.86 \times 10^4$.

EXAMPLE 3

Photographic Evaluation

Test photographic elements were prepared by coating a silver halide emulsion containing 0.2 μm cubic silver bromoiodide (97.44:2.56) on a polyester support at a level of 1.08 g Ag/m² and 7.32 g gelatin/m². The emulsions were spectrally sensitized with dyes 1, 6, and 12 of formula (I), and comparison dyes A and C according to U.S. Pat. No. 2,177,402 and B according to U.S. T888,016 at 0.8 mmoles/mole Ag.

The elements were given 1 second exposures in a Horton sensitometer, and processed in RP X-Omat ® processing at 35° C. Sensitometric curves were generated from the exposed and processed elements, and speed was determined with threshold speed taken at 0.03 density units above D-min. The speed at λ-max, the broad band speed, and the residual stain (optical density) are reported in Table I below.

TABLE I

| Dye | Peak Speed | λ-max (nm) | Broad-Band Speed | Stain |
|---|---|---|---|---|
| 1 | 201 | 500 | 28 | 0.022 at 472 nm |
| A (comparison) | 190 | 470 | 22 | 0.031 at 445 nm |
| 6 | 210 | 510 | 36 | 0.028 at 480 nm |
| B (comparison) | 203 | 500 | 32 | 0.025 at 480 nm |
| 12 | 204 | 480 | 30 | 0.005 at 450 nm |
| C (comparison) | 188 | 460 | 17 | 0.006 at 420 nm |

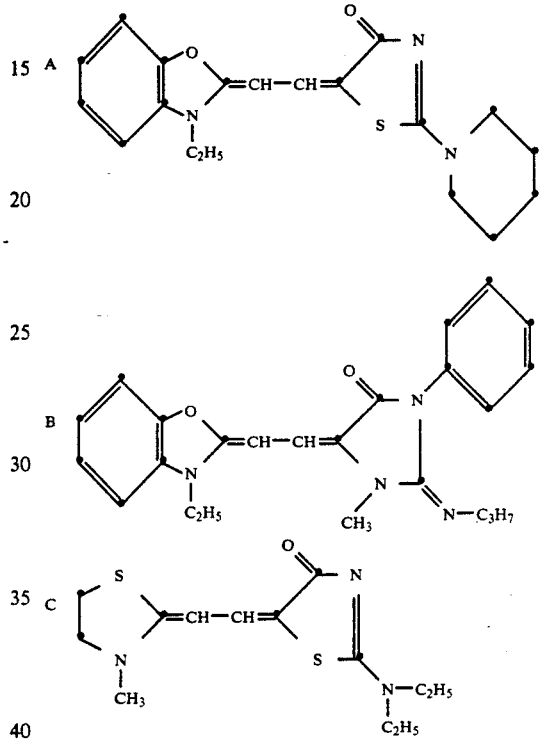

The data in Table I show that the dyes of formula (I) provided significantly greater peak speed and broad band speed than all the comparison dyes and lower stain than comparison dyes A and C.

EXAMPLE 4

In order to evaluate safelight performance of dyes according to formula (I), a number of elements having dyes according to formula (I) at 0.2, 0.6, and 0.8 mmoles/mole Ag were prepared, exposed, and processed as described above for Example 3. For good safelight performance, the dye should provide good photographic speed at wavelengths up to about 520 nm, but have very low sensitivity at wavelengths longer than about 570 nm. The wavelength of maximum sensitivity, the speed at that wavelength, and the cutoff wavelength (beyond which little sensitivity is exhibited) are presented below for Table II.

TABLE II-continued

| | Photographic Data for Dyes in Table I | | | |
|---|---|---|---|---|
| Dye | Dye Level | Sens. Max. | Speed | Horton Cutoff |
| | 0.6 | 500 | 214 | 550 |
| | 0.8 | 500 | 217 | 550 |
| 2 | 0.2 | 500 | 149 | 530 |
| | 0.6 | 500 | 184 | 540 |
| | 0.8 | 500 | 190 | 540 |
| 3 | 0.2 | 500 | 175 | 540 |
| | 0.6 | 510 | 201 | 550 |
| | 0.8 | 510 | 205 | 550 |
| 4 | 0.2 | 500 | 152 | 530 |
| | 0.6 | 500 | 179 | 540 |
| | 0.8 | 500 | 180 | 540 |
| 5 | 0.2 | 500 | 171 | 540 |
| | 0.6 | 500 | 199 | 550 |
| | 0.8 | 500 | 202 | 550 |
| 12 | 0.2 | 470 | 174 | 520 |
| | 0.6 | 480 | 193 | 530 |
| | 0.8 | 480 | 195 | 530 |
| D (comp.) | 0.2 | 520 | 163 | 550 |
| | 0.6 | 550 | 236 | 580 |
| | 0.8 | 550 | 236 | 580 |
| E (comp.) | 0.2 | 500 | 133 | 530 |
| | 0.6 | 500 | 162 | 540 |
| | 0.8 | 500 | 173 | 540 |

The photographic speed at 500 nm for dyes 1, 6, 3, and 5 is over 200, much higher than Dye E, a dye sometimes used for this application. The other comparison dye, dye D, has good photographic speed at 550 nm, but is slow at 500 nm. Dyes like D and E must frequently be used in combination to achieve all the desired features of the photographic system. The cutoff wavelength of 580 nm for dye D does not provide adequate safelight protection. The dyes of formula (I) all have cutoffs that are 30–40 nm shorter than dye D, which is a significant advantage.

The invention has been described in detail with particular reference to preferred embodiments thereof, but it will be understood that variations and modifications can be effected within the spirit and scope of the invention.

What is claimed is:

1. A photographic element comprising a support having thereon at least one silver halide emulsion layer sensitized with a dye according to the formula:

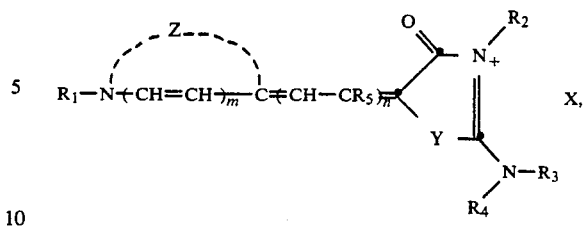

wherein n is 0, 1, or 2, m is 0 or 1, $R_1$ and $R_2$ are each independently substituted or unsubstituted alkyl or substituted or unsubstituted aryl, $R_3$ and $R_4$ are each independently substituted or unsubstituted alkyl or substituted or unsubstituted aryl, or together with the nitrogen to which they are attached, form a substituted or unsubstituted heterocyclic ring, $R_5$ is H, lower alkyl, or substituted or unsubstituted aryl when n is 1, and H when n is 2, Z represents the atoms necessary to complete a substituted or unsubstituted 5- or 6-membered heterocyclic ring, Y represents S or N—$R_6$ wherein $R_6$ is substituted or unsubstituted alkyl or substituted or unsubstituted aryl, and X is a counterion as needed to balance the charge of the molecule.

2. A photographic element according to claim 1 wherein Z represents the atoms necessary to complete a substituted or unsubstituted benzoxazole nucleus, a substituted or unsubstituted thiazole nucleus, or a substituted or unsubstituted thiazoline nucleus.

3. A photographic element according to claim 1 wherein n is 1.

4. A photographic element according to claim 3 wherein Z represents the atoms necessary to complete a substituted or unsubstituted benzoxazole nucleus or a substituted or unsubstituted thiazoline nucleus.

5. A photographic element according to claim 4 wherein at least one of $R_1$ and $R_2$ is substituted with an acid or acid salt substituent.

6. A photographic element according to claim 1 wherein at least one of $R_1$ and $R_2$ is substituted with an acid or acid salt substituent.

7. A photographic element according to claim 1 wherein $R_1$, $R_2$, $R_3$, and $R_4$ are each independently substituted or unsubstituted alkyl.

8. A photographic element according to claim 7 wherein $R_1$ is alkyl substituted with an acid or acid salt substituent.

* * * * *